(12) United States Patent
Hou et al.

(10) Patent No.: US 11,506,964 B2
(45) Date of Patent: Nov. 22, 2022

(54) WAVELENGTH CONVERSION ELEMENT AND PROJECTOR

(71) Applicant: Coretronic Corporation, Hsin-Chu (TW)

(72) Inventors: Ming-Feng Hou, Hsin-Chu (TW); Shi-Wen Lin, Hsin-Chu (TW); Shih-Hang Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/367,621

(22) Filed: Jul. 5, 2021

(65) Prior Publication Data

US 2022/0057700 A1 Feb. 24, 2022

(30) Foreign Application Priority Data

Aug. 24, 2020 (CN) .......................... 202021773854.0

(51) Int. Cl.
*G03B 21/20* (2006.01)
*G03B 21/16* (2006.01)
*G02B 26/00* (2006.01)

(52) U.S. Cl.
CPC .......... *G03B 21/204* (2013.01); *G02B 26/008* (2013.01); *G03B 21/16* (2013.01)

(58) Field of Classification Search
None
See application file for complete search history.

(56) References Cited

U.S. PATENT DOCUMENTS 9,983,467 B2    5/2018  Kitade et al.
2017/0353701 A1* 12/2017 Egawa ................. H04N 9/3105

FOREIGN PATENT DOCUMENTS

CN    104676492    6/2015
CN    106199947    11/2018

* cited by examiner

*Primary Examiner* — Bao-Luan Q Le
*Assistant Examiner* — Danell L Owens
(74) *Attorney, Agent, or Firm* — JCIPRNET

(57) ABSTRACT

A wavelength conversion element, including a turntable, is provided. The turntable is configured to rotate along a central axis. The turntable has a first surface and a plurality of first turbulence portions and a plurality of second turbulence portions located on the first surface, wherein the first turbulence portions and the second turbulence portions are arranged by surrounding the central axis, a shape of each of the first turbulence portions is different from a shape of each of the second turbulence portions, and at least one of the second turbulence portions is arranged between two adjacent first turbulence portions of the first turbulence portions. A projector, including the wavelength conversion element, is further provided. The wavelength conversion element and the projector effectively improve the heat dissipation effect.

20 Claims, 3 Drawing Sheets

WAVELENGTH CONVERSION ELEMENT AND PROJECTOR

CROSS-REFERENCE TO RELATED APPLICATION

This application claims the priority benefit of China application serial no. 202021773854.0, filed on Aug. 24, 2020. The entirety of the above-mentioned patent application is hereby incorporated by reference herein and made a part of this specification.

BACKGROUND

Technical Field

The invention relates to a wavelength conversion element and a projector, and particularly relates to a wavelength conversion element and a projector with a good heat dissipation effect.

Description of Related Art

In a known projection device, a heat dissipation effect of a fluorescent color wheel is closely related to wavelength conversion efficiency, and the heat dissipation effect of the fluorescent color wheel is usually related to a material, a size, and a heat dissipation mechanism of itself. In order to achieve a good projection quality while considering an overall size and cost of the mechanism, the material and size of the fluorescent color wheel are difficult to change. A current research and development direction is more inclined to a design of a turbulence mechanism on the fluorescent color wheel, for example, a concavo-convex structure is used to produce a turbulence effect to drive a surrounding airflow to achieve heat dissipation and other technical effects.

However, since optical elements such as a wavelength conversion layer need to be installed on the fluorescent color wheel, a space required for configuring the turbulence mechanism is quite limited, and it is difficult for a conventional design to produce a better heat dissipation effect in the limited space. Therefore, how to design the turbulence mechanism with better heat dissipation effect in the limited space is an important issue for the related heat transfer research and development.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a wavelength conversion element, which has a special turbulence design.

The invention provides a projector, which has the aforementioned wavelength conversion element.

Other objectives and advantages of the invention may be further illustrated by the technical features broadly embodied and described as follows.

In order to achieve one, a portion of, or all of the objectives or other objectives, an embodiment of the invention provides a wavelength conversion element including a turntable. The turntable is configured to rotate along a central axis. The turntable has a first surface, a plurality of first turbulence portions and a plurality of second turbulence portions located on the first surface, wherein the first turbulence portions and the second turbulence portions are arranged by surrounding the central axis, a shape of each first turbulence portion is different from a shape of each second turbulence portion, and at least one of the second turbulence portions is arranged between two adjacent first turbulence portions of the first turbulence portions.

The invention provides a projector including a light source, a wavelength conversion element, a turntable, a light valve and a projection lens. The light source is configured to emit an illumination light beam. The wavelength conversion element is arranged on an optical path of the illumination light beam and configured to convert the illumination light beam into a converted light beam, and the wavelength conversion element includes a turntable. The turntable is configured to rotate along a central axis. The turntable has a first surface, a plurality of first turbulence portions and a plurality of second turbulence portions located on the first surface, wherein the first turbulence portions and the second turbulence portions are arranged by surrounding the central axis, a shape of each first turbulence portion is different from a shape of each second turbulence portion, and at least one of the second turbulence portions is arranged between two adjacent first turbulence portions of the first turbulence portions. The light valve is arranged on an optical path of the converted light beam and configured to convert the converted light beam into an image light beam. The projection lens is arranged on an optical path of the image light beam.

Based on the above descriptions, the wavelength conversion element of the embodiment of the invention has the first turbulence portions and the second turbulence portions disposed on the first surface of the turntable, and the first turbulence portions and the second turbulence portions are arranged by surrounding the central axis, a shape of each first turbulence portion is different from a shape of each second turbulence portion, and at least one of the second turbulence portions is arranged between two adjacent first turbulence portions of the first turbulence portions. Since the wavelength conversion element of the invention is provided with the turbulence portions with two different shapes, the two different turbulence portions may produce at least two turbulence effects, so that the heat dissipation effect is improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
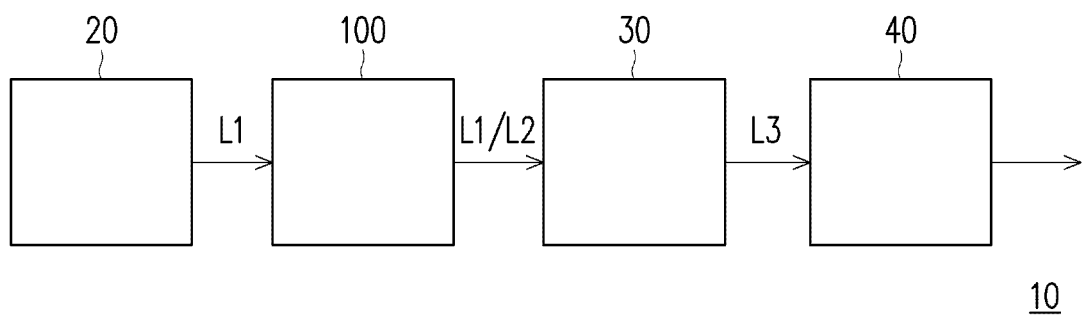
FIG. 1 is a schematic diagram of a projector according to an embodiment of the invention.

FIG. 1 is a schematic diagram of a projector according to an embodiment of the invention. Referring to FIG. 1, a projector 10 of the embodiment includes a light source 20, a wavelength conversion element 100, a light valve 30 and a projection lens 40. The light source 20 is configured to emit an illumination light beam L1. In the embodiment, the light source 20 is, for example, a laser light source 20. For example, the light source 20 may include a plurality of laser diodes (not shown) arranged in an array, but the light source 20 may also be light-emitting diodes, which is not limited by the invention.

The wavelength conversion element 100 is disposed on an optical path of the illumination light beam L1 and is configured to convert the illumination light beam L1 into a converted light beam L2. The wavelength conversion element 100 is configured to convert the illumination light beam L1 of a first wavelength (for example, blue light) into the converted light beam L2 of a second wavelength (for example, yellow light), where the first wavelength is different from the second wavelength, but the color of the converted light beam L2 is not limited thereto.

The light valve 30 is disposed on an optical path of the converted light beam L2 and is configured to convert the converted light beam L2 into an image light beam L3. In the embodiment, the light valve 30 is, for example, a digital micro-mirror device (DMD) or a liquid-crystal-on-silicon panel (LCOS panel). However, in other embodiments, the light valve 30 may also be a transmissive liquid crystal panel or other light beam modulators.

The projection lens 40 is arranged on an optical path of the image light beam L3. The projection lens 40 includes, for example, a combination of one or a plurality of optical lenses with refractive powers, such as various combinations of non-planar lenses such as a biconcave lens, a biconvex lens, a concavo-convex lens, a convexo-concave lens, a plano-convex lens, a plano-concave lens, etc. In an embodiment, the projection lens 40 may also include a planar optical lens to project the image light beam L3 coming from the light valve 30 out of the projector 10 in a reflective or transmissive manner, but the pattern and type of the projection lens 40 are not limited thereto.

In the embodiment, the wavelength conversion element 100 may also reflect the illumination light beam L1 or allow the illumination light beam L1 to penetrate and transmit the illumination light beam L1 to the light valve 30. The light valve 30 is arranged on the optical path of the illumination light beam L1 and the converted light beam L2 coming from the wavelength conversion element 100 and is configured to convert the illumination light beam L1 and the converted light beam L2 into the image light beam L3, and then the projection lens 40 projects the image light beam L3 out of the projector 10.

In the embodiment, the wavelength conversion element 100 has a special design and may provide a good heat dissipation effect, which is described in detail below.

Figure 2:
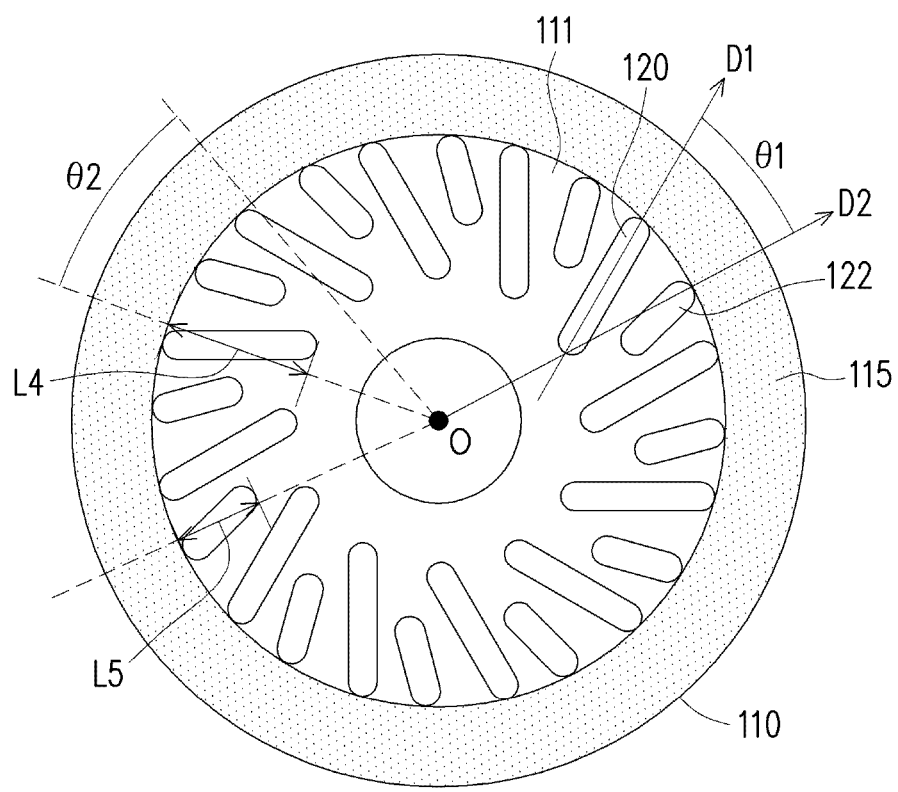
FIG. 2 is a schematic front view of a wavelength conversion element according to an embodiment of the invention.

FIG. 2 is a schematic front view of a wavelength conversion element according to an embodiment of the invention. Referring to FIG. 2, the wavelength conversion element 100 including a turntable 110. The turntable 110 is configured to rotate along a central axis O. The turntable 110 has a first surface 111, a plurality of first turbulence portions 120, a plurality of second turbulence portions 122, and a wavelength conversion region 115 located on the first surface 111. The wavelength conversion region 115 is, for example, located at an outer side of the first turbulence portions 120 and the second turbulence portions 122, but the location and a distribution region of the wavelength conversion region 115 are not limited to thereto. In other embodiments, the wavelength conversion region may not be a complete ring, and the wavelength conversion region may be arranged adjacent to a reflective region or a transmissive region to reflect the illumination light beam or allow the illumination light beam to penetrate.

The first turbulence portions 120 and the second turbulence portions 122 are arranged by surrounding the central axis O, a shape of each first turbulence portion 120 is different from a shape of each second turbulence portion 122. In the embodiment, at least one of the second turbulence portions 122 is arranged between two adjacent first turbulence portions 120 of the first turbulence portions 120. The first turbulence portions 120 and the second turbulence portions 122 are, for example, staggered, but the invention is not limited thereto.

In the embodiment, one second turbulence portion 122 is disposed between two adjacent first turbulence portions 120, which may make a more effective use of space and improve a heat transfer effect. In addition, since the wavelength conversion element 100 is provided with the turbulence portions of two different shapes, at least two turbulence effects may be generated, so that a heat dissipation effect may be improved.

In the embodiment, the shape of the first turbulence portion 120 includes an elongated shape, and the shape of the second turbulence portion 122 includes an elongated shape. A length L4 of each first turbulence portion 120 in a radial direction D2 of the turntable 110 is greater than a length L5 of each second turbulence portion 122 in the radial direction D2. Certainly, the relationships between the shapes and sizes of the first turbulence portion 120 and the second turbulence portion 122 are not limited thereto. In other embodiments, the shape of the first turbulence portion 120 may also be an arc shape, and the shape of the second turbulence portion 122 may also be an arc shape, a water drop shape, a round shape, or an oval shape.

It should be noted that if an extending direction of the turbulence portion points to the central axis O, it represents that at least a part of the turbulence portion is parallel to the radial direction, which will produce a greater air resistance. In order to avoid the above-mentioned problem, according to FIG. 2, in the embodiment, the extending direction D1 of the first turbulence portion 120 is not parallel to the radial direction D2 of the turntable 110. In this way, the air resistance received by the first turbulence portion 120 may be reduced to a certain extent, and the extending direction D1 of the first turbulence portion 120 makes the first turbulence portion 120 easier to guide the airflow, so as to effectively improve the heat dissipation effect.

To be specific, in the embodiment, an included angle θ1 between the extending direction D1 of the first turbulence portion 120 and the radial direction D2 of the turntable 110 is between 5 degrees and 60 degrees. Furthermore, the included angle θ1 between the extending direction D1 of the first turbulence portion 120 and the radial direction D2 of the turntable 110 may be between 10 degrees and 30 degrees, but the range of the included angle θ1 is not limited thereto.

Moreover, in the embodiment, the first turbulence portions 120 are evenly distributed on the first surface 111 of the turntable 110. Regarding two adjacent first turbulence portions 120 of the first turbulence portions 120, an included angle θ2 between a connection line between a center of one of the two adjacent first turbulence portions 120 and the central axis O of the turntable 110 and a connection line between a center of the other one of the two adjacent first turbulence portions 120 and the central axis O of the turntable 110 is smaller than or equal to 30 degrees, and the included angle θ2 is, for example, 15 degrees, but the range of the included angle θ2 is not limited thereto.

It should be noted that the smaller the included angles θ1 and θ2 are, the greater the number of the first turbulence portions 120 that may be configured in the limited space is, and the better the heat dissipation effect is. However, if the included angles θ1 and θ2 are too small, the configuration of the second turbulence portions 122 may also be affected. Through simulation, the included angles θ1 and θ2 in the above range may have better performance.

The wavelength conversion elements of other implementations are listed below, and the main differences from the previous embodiment will be described, and the same or similar parts are not repeated.

Figure 3:
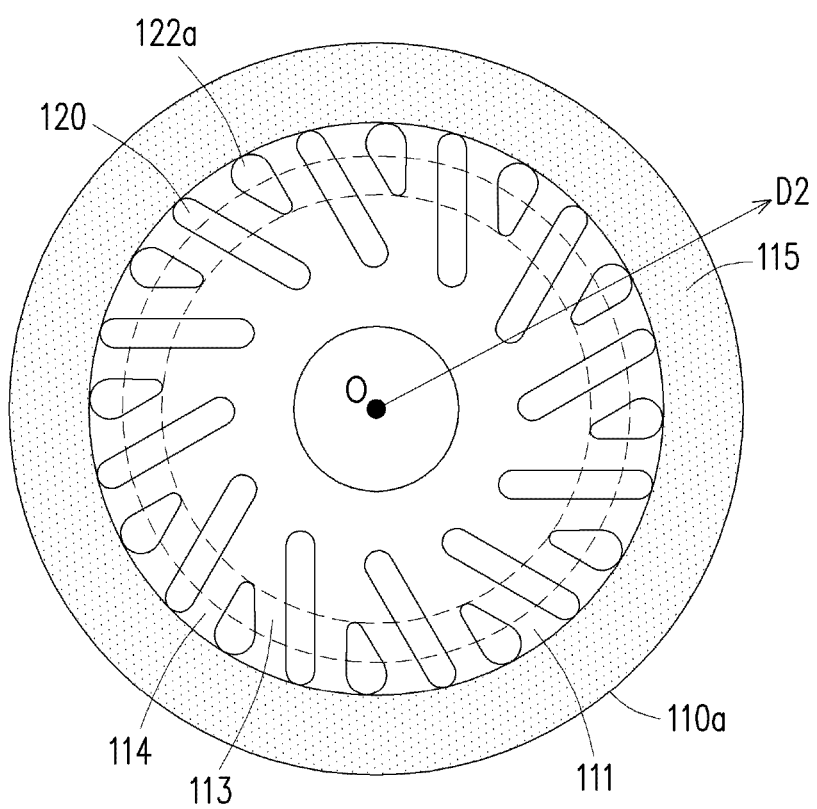
FIG. 3 and FIG. 4 are schematic front views of multiple wavelength conversion elements according to other embodiments of the invention.
Figure 4:
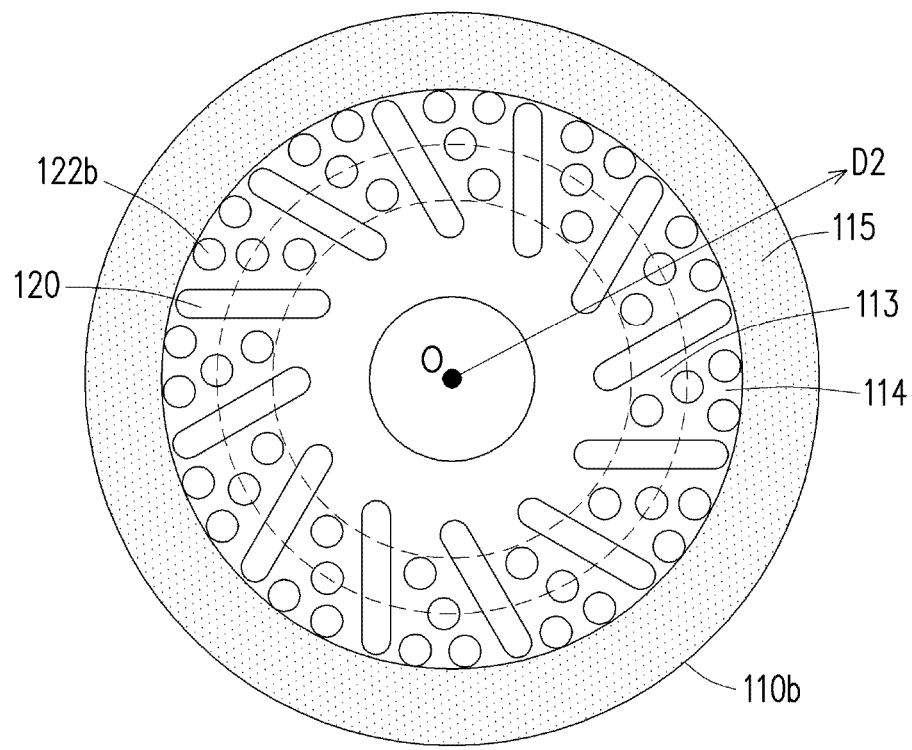

FIG. 3 and FIG. 4 are schematic front views of multiple wavelength conversion elements according to other embodiments of the invention. Referring to FIG. 3, in the embodiment, a turntable 110a has a first annular region 113 and a second annular region 114 arranged from the central axis O along the radial direction D2. A width of the first annular region 113 is the same as a width of the second annular region 114. The first annular region 113 is closer to the central axis O, and the second annular region 114 is farther away from the central axis O. In addition, the wavelength conversion region 115 is located at an outer side of the first annular region 113 and the second annular region 114.

It should be noted that in the embodiment, a sum of areas of the second turbulence portions 122a in the second annular region 114 is greater than a sum of areas of the second turbulence portions 122a in the first annular region 113. Specifically, in the embodiment, an area of each second turbulence portion 122a in the second annular region 114 is greater than an area of the second turbulence portion 122a in the first annular region 113.

For example, in the embodiment, the shape of the second turbulence portion 122a is a water drop shape. A tip of the water drop shape is located in the first annular region 113, and a bottom end of the water drop shape is located in the second annular region 114. Therefore, the area of the second turbulence portion 122a in the second annular region 114 may be greater than the area of the second turbulence portion 122a in the first annular region 113.

When the turntable 110a rotates, since the farther away a position is from the central axis O in the radial direction D2, the greater a rotational speed thereof is, and the farther away the second turbulence portion 122a is from the central axis O in the radial direction D2, the greater the area of the second turbulence portion 122a is, and the better the turbulence effect is. Therefore, in the embodiment, the part of the second turbulence portion 122a with the larger area is arranged in the second annular region 114 with a higher rotation speed, so as to effectively improve the turbulence effect and increase the heat dissipation effect.

Certainly, the configuration that the sum of the areas of the second turbulence portions 122a in the second annular region 114 is greater than the sum of the areas of the second turbulence portions 122a in the first annular region 113 is not limited thereto. Referring to FIG. 4, in a turntable 110b of the embodiment, a number of the second turbulence portions 122b disposed between two adjacent first turbulence portions 120 of the first turbulence portions 120 is greater than or equal to two. In other words, there are more than two second turbulence portions 122b located between two adjacent first turbulence portions 120.

In the embodiment, both of the turntable 110b and the turntable 110a shown in FIG. 3 have the first annular region 113 and the second annular region 114 arranged from the central axis O along the radial direction D2, where the first annular region 113 is closer to the central axis O, and the second annular region 114 is farther away from the central axis O. In addition, the wavelength conversion region 115 is located at the outer side of the first annular region 113 and the second annular region 114. The number of the second turbulence portions 122b in the second annular region 114 is greater than the number of the second turbulence portions 122b in the first annular region 113, so as to achieve the effect that the sum of the areas of the second turbulence portions 122a in the second annular region 114 is greater than the sum of the areas of the second turbulence portions 122a in the first annular region 113.

In the embodiment, a shape of the second turbulence portion 122b is a round shape, but the shape of the second turbulence portion 122b is not limited thereto. Similarly, the greater the number of the second turbulence portions 122b located farther away from the central axis O in the radial direction D2 is, the higher the turbulence effect is, and the higher the heat dissipation effect is. In an embodiment that is not illustrated, a plurality of water drop shaped second turbulence portions may also be arranged between two adjacent first turbulence portions.

Figure 5:
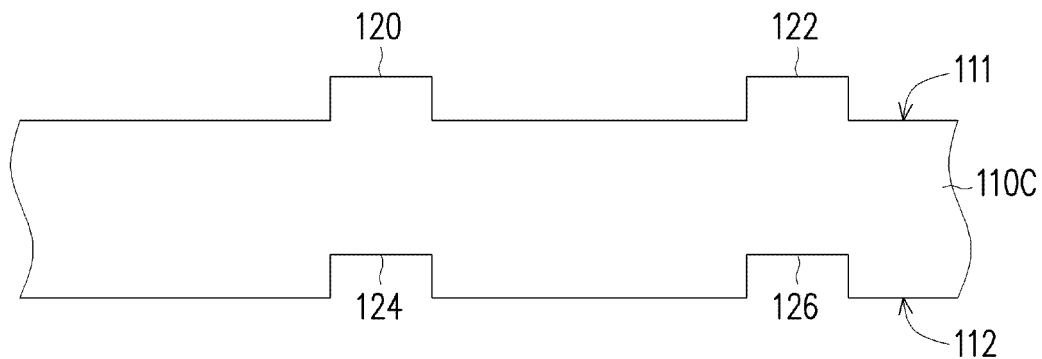
FIG. 5 is a schematic cross-sectional view of a wavelength conversion element according to another embodiment of the invention.

FIG. 5 is a schematic cross-sectional view of a wavelength conversion element according to another embodiment of the invention. Referring to FIG. 5, in the embodiment, the first turbulence portions 120 and the second turbulence portions 122, for example, protrude from the first surface 111 of the turntable 110C. Certainly, in other embodiments, the first turbulence portions 120 may also be recessed in the first surface 111 of the turntable 110C, or/and the second turbulence portions 122 may also be recessed in the first surface 111 of the turntable 110C.

It should be noted that in the embodiment, the turntable 110C has a second surface 112 opposite to the first surface 111 and a plurality of third turbulence portions 124 and a plurality of fourth turbulence portions 126 located on the second surface 112. Shapes of the fourth turbulence portions 126 are different from shapes of the third turbulence portions 124.

In the embodiment, the shapes of the third turbulence portion 124 are, for example, the same as the shapes of the first turbulence portion 120, and the shapes of the fourth turbulence portion 126 are, for example, the same as the shapes of the second turbulence portion 122. In addition, positions of the third turbulence portions 124 and the fourth turbulence portions 126 on the second surface 112 correspond to the positions of the first turbulence portions 120 and the second turbulence portions 122 on the first surface 111.

Moreover, in the embodiment, the third turbulence portions 124 and the fourth turbulence portions 126 are recessed in the second surface 112. In other words, concave and convex contours of the third turbulence portions 124 and the first turbulence portions 120 are opposite, and concave and convex contours of the fourth turbulence portions 126 and the second turbulence portions 122 are opposite.

Due to the opposite contours, in the embodiment, the first turbulence portions 120 and the third turbulence portions 124, and the second turbulence portions 122 and the fourth turbulence portions 126 may be fabricated on the turntable 110C by means of debossing. In other words, the first turbulence portions 120 are directly formed when the third turbulence portions 124 are formed, and the second turbulence portions 122 are directly formed when the fourth turbulence portions 126 are formed.

Certainly, in other embodiments, the shapes and positions of the third turbulence portions 124 may also be different from that of the first turbulence portions 120, and the shapes and positions of the fourth turbulence portions 126 may also be different from that of the second turbulence portions 122. In addition, the third turbulence portions 124 may also protrude from the second surface 112, or/and the fourth turbulence portions 126 may also protrude from the second surface 112, and the manufacturing method of the first turbulence portions 120, the second turbulence portions 122, the third turbulence portions 124 and the fourth turbulence portions 126 is not limited to the above.

In summary, the wavelength conversion element of the embodiment of the invention has the first turbulence portions and the second turbulence portions disposed on the first surface of the turntable, and the first turbulence portions and the second turbulence portions are arranged by surrounding the central axis, a shape of each first turbulence portion is different from a shape of each second turbulence portion, and at least one of the second turbulence portions is arranged between two adjacent first turbulence portions of the first turbulence portions. Since the wavelength conversion element of the invention is provided with the turbulence portions with two different shapes, the two different turbulence portions may produce at least two turbulence effects, so that the heat dissipation effect is improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion element, comprising a turntable, wherein
   the turntable is configured to rotate along a central axis and the turntable has a first surface and a plurality of first turbulence portions and a plurality of second turbulence portions located on the first surface, wherein the first turbulence portions and the second turbulence portions are arranged by surrounding the central axis, a shape of each of the first turbulence portions is different from a shape of each of the second turbulence portions, and at least one of the second turbulence portions is arranged between two adjacent first turbulence portions of the first turbulence portions, wherein the turntable has a first annular region and a second annular region arranged from the central axis along a radial direction, a width of the first annular region is the same as a width of the second annular region, a sum of areas of the second turbulence portions in the second annular region is greater than a sum of areas of the second turbulence portions in the first annular region.

2. The wavelength conversion element as claimed in claim 1, wherein a length of each of the first turbulence portions in a radial direction of the turntable is greater than a length of each of the second turbulence portions in the radial direction.

3. The wavelength conversion element as claimed in claim 1, wherein the shape of each of the first turbulence portions comprises an elongated shape or an arc shape, and the shape of each of the second turbulence portions comprises an elongated shape, an arc shape, a water drop shape, a round shape, or an oval shape.

4. The wavelength conversion element as claimed in claim 1, wherein an extending direction of each of the first turbulence portions is not parallel to a radial direction of the turntable.

5. The wavelength conversion element as claimed in claim 4, wherein an included angle between the extending direction of each of the first turbulence portions and the radial direction of the turntable is between 5 degrees and 60 degrees.

6. The wavelength conversion element as claimed in claim 1, wherein the first turbulence portions are evenly distributed on the first surface of the turntable.

7. The wavelength conversion element as claimed in claim 6, wherein regarding two adjacent first turbulence portions of the first turbulence portions, an included angle between a connection line between a center of one of the two adjacent first turbulence portions and the central axis of the turntable and a connection line between a center of another one of the two adjacent first turbulence portions and the central axis of the turntable is smaller than or equal to 30 degrees.

8. The wavelength conversion element as claimed in claim 1, wherein the first turbulence portions and the second turbulence portions are staggered.

9. The wavelength conversion element as claimed in claim 1, wherein a number of the at least one second turbulence portion disposed between the two adjacent first turbulence portions of the first turbulence portions is greater than or equal to two.

10. The wavelength conversion element as claimed in claim 1, wherein a number of the second turbulence portions in the second annular region is greater than a number of the second turbulence portions in the first annular region.

11. The wavelength conversion element as claimed in claim 1, wherein an area of each of the second turbulence portions in the second annular region is greater than an area of each of the second turbulence portions in the first annular region.

12. The wavelength conversion element as claimed in claim 1, wherein the first turbulence portions are recessed in or protruding from the first surface of the turntable, and the second turbulence portions are recessed in or protruding from the first surface of the turntable.

13. The wavelength conversion element as claimed in claim 1, wherein the turntable has a second surface opposite to the first surface and a plurality of third turbulence portions located on the second surface, and the third turbulence portions are recessed in or protruding from the second surface.

14. The wavelength conversion element as claimed in claim 13, wherein the turntable has a plurality of fourth turbulence portions located on the second surface, shapes of the fourth turbulence portions are different from shapes of the third turbulence portions, and the fourth turbulence portions are recessed in or protruding from the second surface.

15. The wavelength conversion element as claimed in claim 14, wherein positions of the third turbulence portions and the fourth turbulence portions on the second surface correspond to positions of the first turbulence portions and the second turbulence portions on the first surface.

16. The wavelength conversion element as claimed in claim 15, wherein concave and convex contours of the third turbulence portions and the first turbulence portions are opposite, and concave and convex contours of the fourth turbulence portions and the second turbulence portions are opposite.

17. A projector, comprising a light source, a wavelength conversion element, a light valve, and a projection lens, wherein
the light source is configured to emit an illumination light beam;
the wavelength conversion element is arranged on an optical path of the illumination light beam and configured to convert the illumination light beam into a converted light beam, and the wavelength conversion element comprises a turntable, wherein
the turntable is configured to rotate along a central axis and the turntable has a first surface and a plurality of first turbulence portions and a plurality of second turbulence portions located on the first surface, wherein the first turbulence portions and the second turbulence portions are arranged by surrounding the central axis, a shape of each of the first turbulence portions is different from a shape of each of the second turbulence portions, and at least one of the second turbulence portions is arranged between two adjacent first turbulence portions of the first turbulence portions;
the light valve is arranged on an optical path of the converted light beam and configured to convert the converted light beam into an image light beam; and
the projection lens is arranged on an optical path of the image light beam, wherein the turntable has a first annular region and a second annular region arranged from the central axis along a radial direction, a width of the first annular region is the same as a width of the second annular region, a sum of areas of the second turbulence portions in the second annular region is greater than a sum of areas of the second turbulence portions in the first annular region.

18. The projector as claimed in claim 17, wherein an extending direction of each of the first turbulence portions is not parallel to a radial direction of the turntable.

19. A wavelength conversion element, comprising a turntable, wherein
the turntable is configured to rotate along a central axis and the turntable has a first surface and a plurality of first turbulence portions and a plurality of second turbulence portions located on the first surface, wherein the first turbulence portions and the second turbulence portions are arranged by surrounding the central axis, a shape of each of the first turbulence portions is different from a shape of each of the second turbulence portions, and at least one of the second turbulence portions is arranged between two adjacent first turbulence portions of the first turbulence portions,
wherein regarding two adjacent first turbulence portions of the first turbulence portions, an included angle between a connection line between a center of one of the two adjacent first turbulence portions and the central axis of the turntable and a connection line between a center of another one of the two adjacent first turbulence portions and the central axis of the turntable is smaller than or equal to 30 degrees.

20. A wavelength conversion element, comprising a turntable, wherein the turntable is configured to rotate along a central axis and the turntable has a first surface and a plurality of first turbulence portions and a plurality of second turbulence portions located on the first surface, wherein the first turbulence portions and the second turbulence portions are arranged by surrounding the central axis, a shape of each of the first turbulence portions is different from a shape of each of the second turbulence portions, and at least one of the second turbulence portions is arranged between two adjacent first turbulence portions of the first turbulence portions, wherein the turntable has a second surface opposite to the first surface and a plurality of third turbulence portions located on the second surface, and the third turbulence portions are recessed in or protruding from the second surface.

* * * * *